United States Patent
Slasinski

(10) Patent No.: US 6,244,779 B1
(45) Date of Patent: Jun. 12, 2001

(54) ANGULARLY ADJUSTABLE COUPLING

(76) Inventor: Michael Slasinski, 7201 Danny Dr., Saginaw, MI (US) 48609

( * ) Notice: Subject to any disclaimer, the term of this patent is extended or adjusted under 35 U.S.C. 154(b) by 0 days.

(21) Appl. No.: 09/325,484

(22) Filed: Jun. 3, 1999

Related U.S. Application Data

(60) Provisional application No. 60/087,822, filed on Jun. 3, 1998, and provisional application No. 60/124,237, filed on Mar. 12, 1999.

(51) Int. Cl.⁷ .................................................. F16C 11/00
(52) U.S. Cl. ...................... 403/92; 403/110; 403/322.4; 403/325
(58) Field of Search ............................... 403/218, 82, 87, 403/88, 93, 92, 94, 95, 97, 110, 325, 322.4, 330, DIG. 4; 280/775

(56) References Cited

U.S. PATENT DOCUMENTS

| | | |
|---|---|---|
| 1,887,878 | 11/1932 | Smith . |
| 1,894,489 | 1/1933 | Hirose et al. . |
| 2,456,054 * | 12/1948 | Eberhardt ........................ 403/325 X |
| 2,476,427 * | 7/1949 | Melvin et al. ...................... 403/110 |
| 2,517,125 * | 8/1950 | Ludwig ............................ 403/110 X |
| 2,923,565 * | 2/1960 | Klebe ............................... 403/325 X |
| 3,018,122 * | 1/1962 | Frei et al. ........................ 403/325 X |
| 3,504,569 * | 4/1970 | Zoltok .................................. 280/775 |
| 3,693,469 | 9/1972 | Ozaki ..................................... 74/489 |
| 3,693,770 | 9/1972 | Charachian et al. .................. 192/30 |
| 3,943,794 | 3/1976 | Shimada ............................. 74/501.5 |
| 4,222,473 | 9/1980 | Kopich ............................... 192/43.1 |
| 4,249,799 * | 2/1981 | Iglesias ............................ 403/330 X |
| 4,269,422 * | 5/1981 | Biggs ............................... 403/330 X |
| 4,604,910 | 8/1986 | Chadwick et al. ...................... 74/96 |
| 4,666,328 | 5/1987 | Ryu ........................................ 403/92 |
| 4,679,756 * | 7/1987 | Wood ................................. 403/92 X |
| 4,824,278 * | 4/1989 | Chang ..................................... 403/93 |
| 5,235,867 | 8/1993 | Wortmann et al. .................. 74/501.5 |
| 5,279,387 | 1/1994 | Swiderski et al. ..................... 182/27 |
| 5,302,039 * | 4/1994 | Omholt ................................ 403/218 |
| 5,337,869 | 8/1994 | Zlotek ................................. 192/45.1 |
| 5,482,144 | 1/1996 | Vranish ..................................... 188/6 |
| 5,689,999 | 11/1997 | Wiley et al. ............................ 74/527 |
| 5,961,220 * | 10/1999 | Som et al. .......................... 403/87 X |
| 6,065,897 * | 5/2000 | Lutz, III ............................... 403/325 |
| 6,086,284 * | 7/2000 | Callahan ................................ 403/93 |
| 6,092,778 * | 7/2000 | Lang et al. ......................... 403/92 X |

OTHER PUBLICATIONS

PTO Disclosure Document #40907 dated May 10, 1998 (Applicant believes this document is a PTO disclosure document based on the information appearing on its face).

50 Design News/Dec. 15, 1997; Designer's corner, Useful technology for your idea file.

* cited by examiner

Primary Examiner—Lynne H. Browne
Assistant Examiner—David E. Bochna
(74) Attorney, Agent, or Firm—Gifford, Krass, Groh, Sprinkle, Anderson & Citkowski, PC

(57) ABSTRACT

An angularly adjustable coupling includes two coupling members pivotally mounted to each other about a pivot axis. One coupling member includes a locking rib of circular configuration coaxial with the pivot axis, and the other coupling member includes a pair of pivotal arms having locking surfaces normally engageable with the locking rib to lock the two coupling members against pivotal movement, but manually moveable to release the locking rib and to permit one coupling member to be pivoted with respect to the other to any desired angular position.

15 Claims, 13 Drawing Sheets

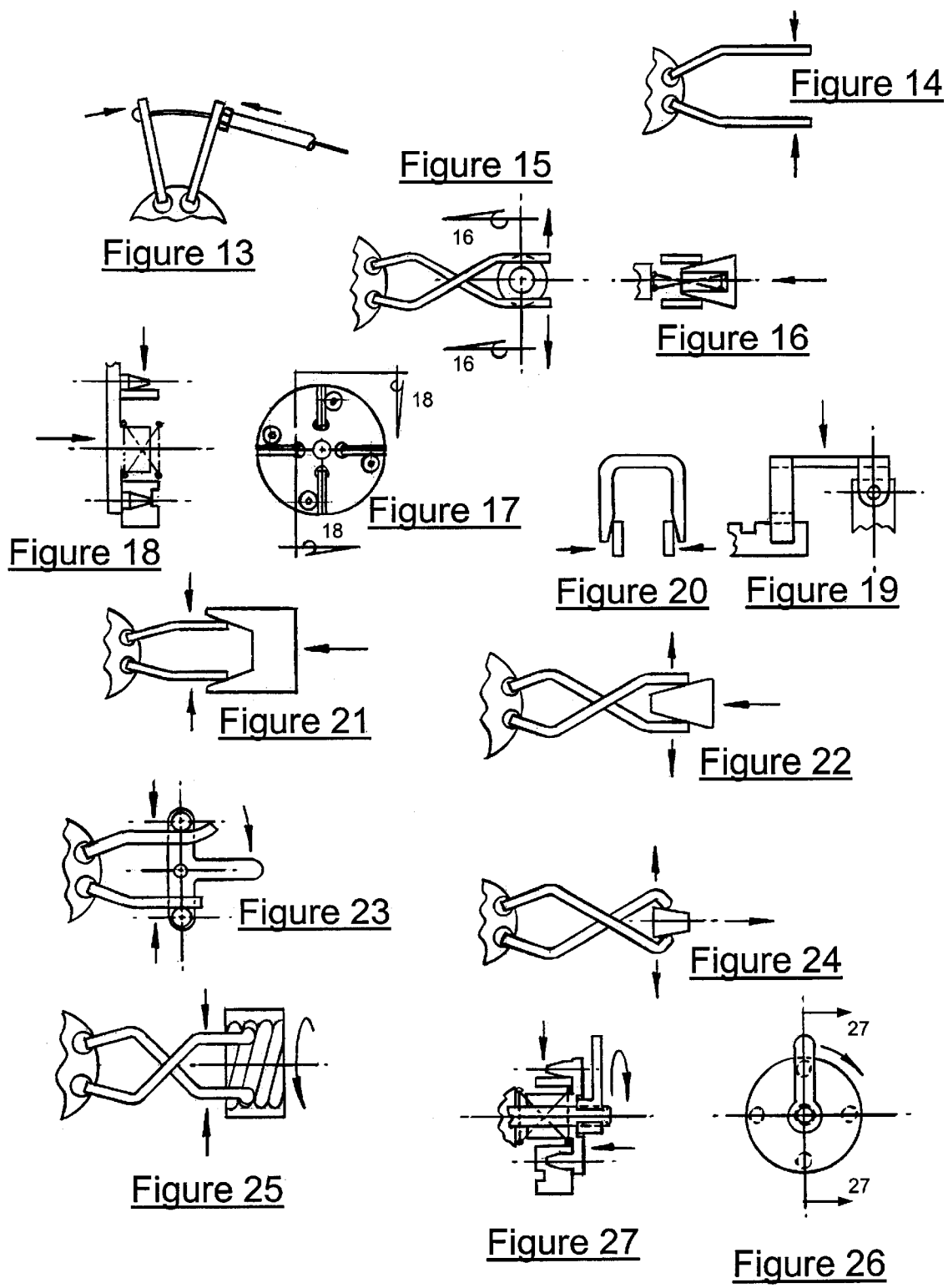

ANGULARLY ADJUSTABLE COUPLING

CROSS-REFERENCE TO RELATED APPLICATIONS

This application claims the benefit of U.S. Provisional Applications having Ser. No. 60/087,822 filed Jun. 3, 1998 and Ser. No. 60/124,237 filed Mar. 12, 1999.

FIELD AND BACKGROUND OF THE INVENTION

The present invention relates to angularly adjustable couplings and, more particularly, to pivotal couplings which permit angular adjustment of the two coupled members in a continuous manner and over a relatively wide range.

Many types of angularly adjustable couplings have been developed for a wide variety of applications. Examples of different types of constructions and applications for such couplings are described in U.S. Pat. Nos. 1,887,878; 1,894,489; 3,693,469; 3,693,770; 3,943,794; 4,666,328; 5,279,387; and 5,689,999. Many of these constructions permit angular adjustment only in increments rather than continuously, or only over a short range rather than a wide range. Others do not permit angular adjustment in a quick and facile manner, or do not securely lock the coupling in its adjusted position. Still others involve complicated parts which are expensive to manufacture and to assemble.

OBJECTS AND BRIEF SUMMARY OF THE INVENTION

An object of the present invention is to provide a novel angularly adjustable coupling having advantages in the above respects.

According to one aspect of the present invention, there is provided an angularly adjustable coupling, comprising a first coupling member, a second coupling member, and a pivotal mounting interconnecting the two members together about a pivot axis. The first coupling member includes a locking rib of circular configuration coaxial with the pivot axis. The second coupling member includes a pair of pivotal arms having inner ends disposed within the area inward of the locking rib, outer ends extending outwardly of the area occupied by the locking rib, and locking surfaces between the inner and outer ends engageable with the locking rib for locking the two coupling members against pivotal movement. The pair of pivotal arms are spring-biased to a locking position where their locking surfaces engage the locking rib, thereby locking the two coupling members against pivotal movement. The outer ends of the pivotal arms are moveable by a user to cause the locking surfaces to release from the locking rib, and thereby to permit one coupling member to be pivoted with respect to the other coupling member and to be locked in the pivoted position by releasing the outer ends of the pivotal arms.

According to further features in one of the preferred embodiments of the invention described below for purposes of example, the locking surfaces of the pivotal arms are defined by opposed edges of a passageway formed in each pivotal arm for receiving the circular locking rib. The distance between the opposed edges of each passageway is slightly larger than the width of the locking rib such that when the pivotal arms are moved to an unlocked position, the edges release from the locking rib to permit pivoting of one member with respect to the other, and when the pivotal arms are permitted to return to their normal biased position, the opposed edges engage the locking rib to lock the second member thereto by a wedging action.

As will be described more particularly below, an angularly adjustable coupling constructed in accordance with the foregoing features provides a wide range of continuous adjustment of the coupling members, allows quick change of the angular adjustment whenever desired, securely locks the coupling members in any adjusted position, and enables the adjustable coupling to be constructed with a relatively few simple parts which can be produced in volume and at relatively low cost.

Further features and advantages of the invention will be apparent from the description below.

BRIEF DESCRIPTION OF THE DRAWINGS

The invention is herein described, by way of example only, with reference to the accompanying drawings, wherein:

FIG. 13 is a sketch of a pull cable release for a coupling according to the present invention;

FIG. 14 is a sketch of a pinch release for a coupling according to the present invention;

FIG. 15 is a sketch of a single push-pin release for a coupling according to the present invention;

FIG. 16 is a cross-sectional view of the release of FIG. 15 taken along lines 16—16;

FIG. 17 is a sketch of a multiple push-pin release for a coupling according to the present invention;

FIG. 18 is a cross-sectional view of the release of FIG. 17 taken along lines 18—18;

FIG. 19 is a sketch of a pivoting lever release for use with a coupling according to the present invention;

FIG. 20 is an end view of the pivoting lever release of FIG. 19;

FIG. 21 is a sketch of an external push wedge release for use with a coupling according to the present invention;

FIG. 22 is a sketch of a wedge release for use with a coupling according to the present invention;

FIG. 23 is a sketch of a rotating lever release for a coupling according to the present invention;

FIG. 24 is a sketch of a pull wedge release for use with a coupling according to the present invention;

FIG. 25 is a sketch of a rotary cam release for use with a coupling according to the present invention;

FIG. 26 is a sketch of a multi-lead screw release for use with a coupling according to the present invention; and FIG. 27 is a cross-sectional view of the release of FIG. 26 taken along lines 27—27.

DESCRIPTION OF PREFERRED EMBODIMENTS

Figure 1:
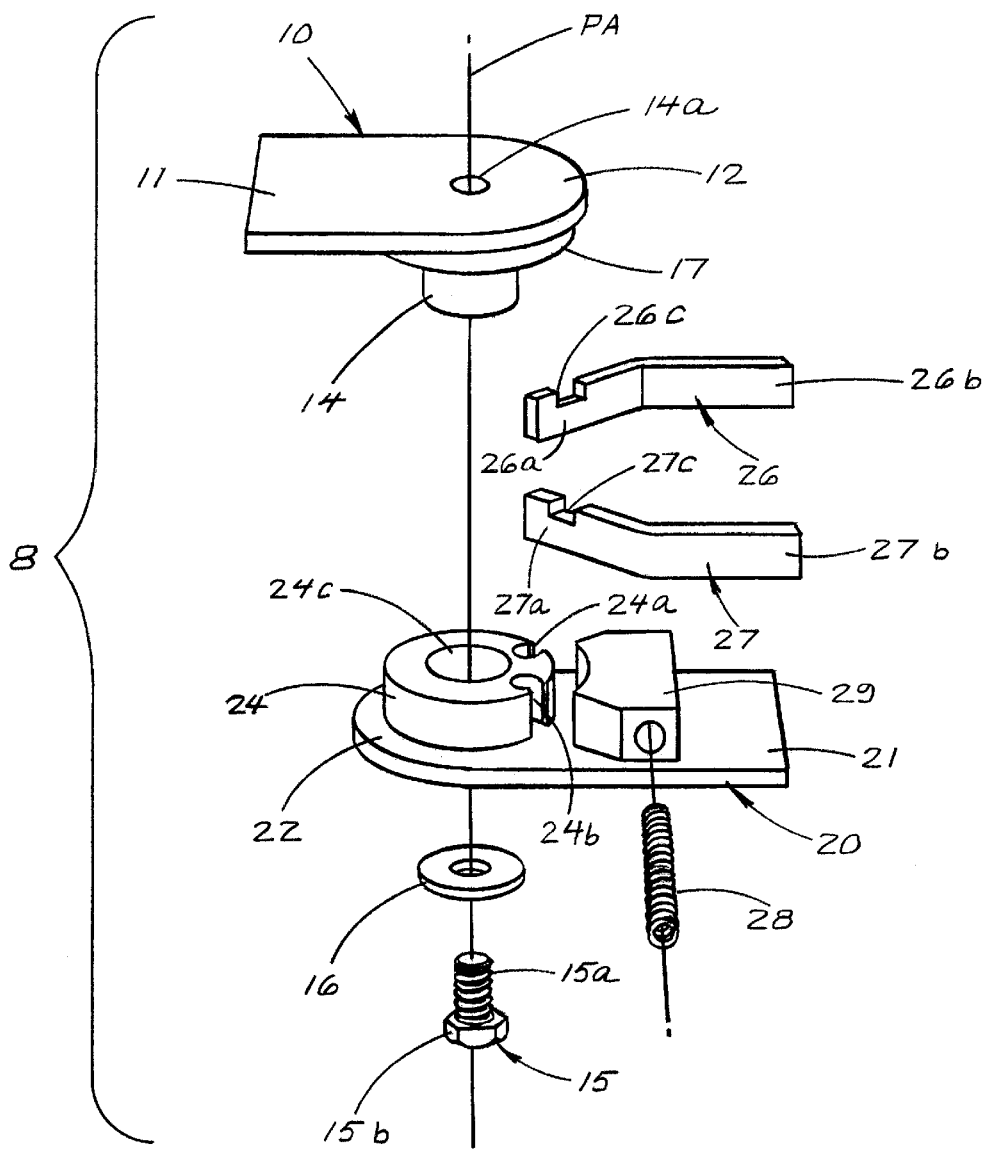
FIG. 1 is an exploded perspective view of the first embodiment of an angularly adjustable coupling according to the present invention.
Figure 2:
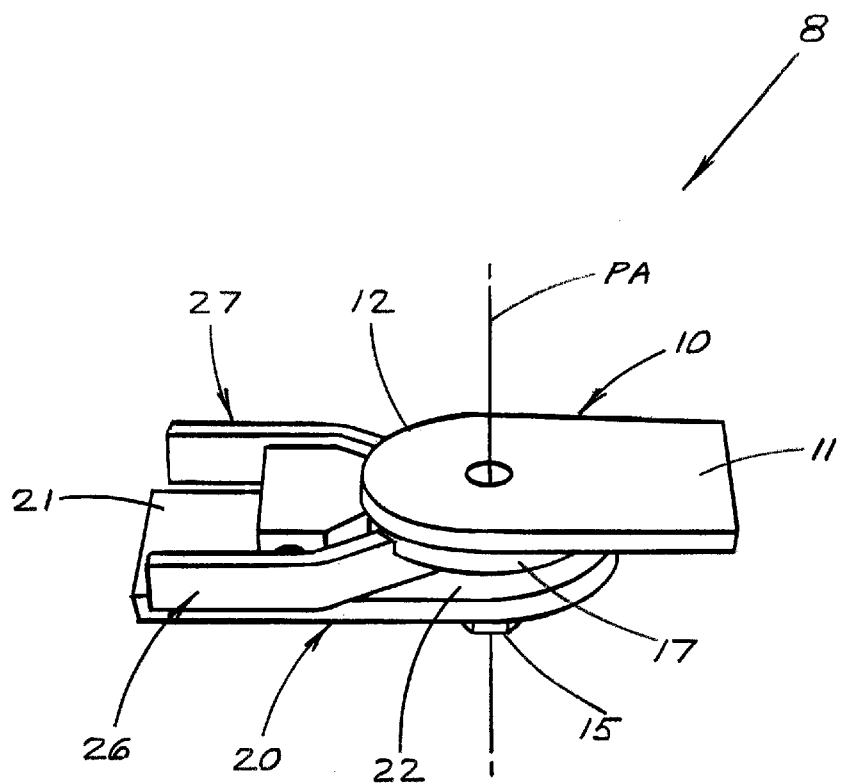
FIG. 2 is an assembled perspective view of the angularly adjustable coupling of FIG. 1.

Referring to FIGS. 1 and 2 a first embodiment of an angularly adjustable coupling is generally shown at 8. The angularly adjustable coupling 8 includes a first coupling member, generally designated 10, and a second coupling member, generally designated 20. The two coupling members are pivotally coupled together about a pivot axis PA in a manner which allows the user to conveniently adjust their angular positions and to securely lock them in the newly-adjusted position.

Coupling member 10 includes an outer section 11 for attaching one of the devices (not shown) to be coupled, and an inner section 12 for pivotally mounting such a device to coupling member 20 for coupling the other device (not shown) to be coupled. As will be clear to those of skill in the art, the outer section 11 may be formed in any of several configurations for attaching to a device to be coupled to a second device. For example, the outer section 11 could be formed with a circular bore to accept a threaded shaft or may be formed with a plurality of mounting holes for accepting bolts to mount a plate thereto. Also, the outer section 11 may be eliminated with the device to be coupled being mounted directly to the back of the inner section 12.

The inner section 12 is of a flat, circular configuration; it serves as a pivotal mounting for the second coupling member 20 and also provides a locking construction for releasably locking coupling member 20 in any selected angular position with respect to coupling member 10.

For pivotally mounting coupling member 20, the inner section 12 of coupling member 10 is formed with a downwardly extending cylindrical boss 14 having a central bore 14a at the pivot axis PA for receiving the shank 15a of a pin or bolt 15 having an enlarged head 15b overlying a washer 16. As will be described more fully below, boss 14, pin or bolt 15, and washer 16, cooperate with a boss in the second coupling member 20 to pivotally mount the second coupling member to first coupling member 10 about pivot axis PA.

The inner section 12 of the coupling member 10 further includes an annular locking rib 17 extending perpendicularly downwardly from the flat inner section 12 of the coupling 10. The locking rib 17 is coaxial with the pivot axis PA and boss 14. In cross section, the locking rib 17 is a generally constant cross section wall that extends from the flat inner section 12.

As will be described more fully below, boss 14 of coupling member 10, located coaxially with pivot axis PA, cooperates with a boss in the second coupling member 20 for pivotally mounting the two coupling members 10, 20 together; whereas rib 17, also located coaxially with pivot axis PA, cooperates with locking surfaces on coupling member 20 for securely locking the two coupling members 10, 20 in any selected angular position with respect to each other.

The second coupling member 20 also includes an outer section 21 for attaching a second device (not shown) to be coupled, and an inner section 22 which cooperates with the inner section 12 of coupling member 10 for pivotally mounting second coupling member 20 to first coupling member 10. As with the first coupling member 10, the outer section 21 of the second coupling member 20 may be formed in any of several configurations for mounting to the device to be coupled. The inner section 22 is of a flat circular configuration, corresponding to the flat circular configuration of section 12 of coupling member 10, for pivotally mounting coupling member 20 to coupling member 10.

The inner section 22 of second coupling member 20 is formed with an upwardly extending boss 24 cooperable with boss 14 of first coupling member 10. Boss 24 is of cylindrical configuration, coaxial with the pivot axis PA, and has an inner bore 24c with a diameter close to the outer diameter of boss 14 so as to snugly enclose boss 14. Inner section 22 of second coupling member 20 may be further formed with a circular recess in its underside for accommodating the head 15b of pin or bolt 15, as well as washer 16 underlying the head. It will thus be seen that pin or bolt 15, passing through boss 14 of first coupling member 10 and boss 24 of second coupling member 20 at the pivot axis PA of the two coupling members, permits one coupling member to be pivoted angularly with respect to the other coupling member. Therefore, the bolt 15, and bosses 14 and 24 together form a mounting for interconnecting the two members about the pivot axis PA. It should also be noted that the boss 24 of coupling member 20 resides within the area inward of the locking rib 17 of first coupling member 10 when the coupling members 10 and 20 are nested together.

Second coupling member 20 further includes a pair of pivotal arms 26, 27 which cooperate with the locking rib 17 of coupling member 10 for releasably locking second coupling member 20 in any angular position with respect to first coupling member 10. For this purpose, each of the two pivotal arms 26, 27 has an inner end 26a, 27a pivotally supported by boss 24 within the area inward of the locking rib 17 of coupling member 10. Each of the pivotal arms also has an outer end 26b, 27b extending outwardly of the area occupied by the locking rib 17, and locking surfaces 26c, 27c between the inner and outer ends and engageable with locking rib 17 for locking the two coupling members 10 and 20 against pivotal movement. As shown, the locking surfaces 26c, 27c are formed as notches with widths slightly greater than a width of the locking rib 17 so that locking rib 17 fits into the notches 26c and 27c when the coupling is assembled.

For purposes of pivotally mounting the inner ends 26a, 27a of the two pivotal arms 26, 27, boss 24 is formed with a pair of radially-extending slots 24a, 24b receiving the inner ends 26a, 27a of the two arms 26, 27. The two slots 24a, 24b are shaped so as to accommodate the pivotal movement of the two arms 26, 27 received within these slots.

As shown particularly in FIG. 1, the two pivotal arms 26, 27 extend outwardly of boss 24 of coupling member 20 in a radial direction with respect to boss 24. The outer ends 26b, 27b of the two pivotal arms are then bent to extend substantially parallel to each other. As described more particularly below, the outer end 26b, 27b of pivotal arms 26, 27 serve as finger-pieces engageable by the user for releasing the two coupling members 10, 20 to permit pivoting one member to a new angular position with respect to the other member, and, when released to securely lock the two coupling members in the new angular position.

The opposite edges of notch 26c in pivotal arm 26, and the corresponding edges in a corresponding notch 27c in pivotal arm 27, serve as locking surfaces engageable with locking rib 17 of coupling member 10 for securely locking the two coupling members together in any selected angular position. For this purpose, notch 26c in pivotal arm 26, and the corresponding notch 27c in pivotal arm 27, are of slightly larger width than the width of rib 17 so as to freely receive the rib 17 when the portion of arms 26, 27 containing the notches 26c, 27c are generally perpendicular to the respective portion of the rib 17. However, when the portions of the two arms 26, 27 containing the notches 26c, 27c are not perpendicular to the respective portions of the rib 17, but rather are skewed with respect to those portions of the rib 17, the opposite edges of the notches 26c, 27c engage the outer surfaces of the rib 17 with a wedging or camming action to securely lock the rib 17, thereby locking first coupling member 10 against pivotal movement with respect to second coupling member 20.

As shown particularly in FIG. 1, the two pivotal arms 26, 27 are biased to this skewed locking position by a spring 28 engageable with an intermediate portion of the two pivotal arms 26, 27 just inwardly of the two outer ends 26b, 27b. The spring 28 is supported by a spring housing 29 which is disposed on the outer section 21 of the second coupling member 20 between the pivotal arms 26, 27. Thus, the two pivotal arms 26, 27 are normally biased apart by spring 28 to a skewed locking position with respect to rib 17. However, the two pivotal arms 26, 27 may be manually moved (by squeezing ends 26b, 27b) to a released condition by the user in order to pivot the two arms to a position wherein their notches 26c, 27c receiving the rib 17 are generally perpendicular to the respective portion of the rib 17. In this released condition, the opposite 10 edges of the notches 26c, 27c no longer are in locking engagement with the rib 17, thereby releasing second coupling member 20 for pivotal movement with respect to first coupling member 10. As soon as the outer ends 26b, 27b of the two pivotal arms are released, spring 28 immediately moves the two arms 26, 27 back to a skewed relationship with respect to rib 17, thereby restoring the lock against pivotal movement with respect to the two coupling members.

Operation

In the normal, locked, condition of the illustrated coupling 8, spring 28 biases the two pivotal arms 26, 27 away from each other, so that their notches 26c, 27c are skewed with respect to the portions of the rib 17 passing therethrough, such that the opposed edges of the notches in the pivotal arms 26, 27 firmly engage the rib 17 with a wedging or camming action, thereby firmly locking the two coupling members 10, 20 against any pivotal movement about the pivot axis PA.

Whenever it is desired to change the angular position of the two coupling members 10, 20, the user engages the outer ends 26b, 27b of the two pivotal arms 26, 27, and presses them towards each other until they engage the outer surface of spring support 29 of coupling member 20. The parts are dimensioned such that when the outer ends 26b, 27b of the moveable arms engage the outer surface of support 29, the notches 26c, 27c become generally aligned with the respective portion of rib 17 passing through these notches. Since these notches 26c, 27c are of slightly larger width than rib 17, the opposed surfaces of the notches disengage from the outer surface of rib 17, thereby releasing the rib 17 from the locking action of the arms and permitting the two coupling members 10, 20 to be pivoted about pivot axis PA to a different angular position. As soon as the outer ends 26b, 27b are released by the user, the spring 28 pivots the two arms 26, 27 to their normal skewed positions with respect to the notches 26c, 27c and the portion of rib 17 passing therethrough, to immediately restore the firm locking action exerted by the arms with respect to rib 17. This firmly locks the two coupling members 10, 20 against pivotal movement.

Figure 3:
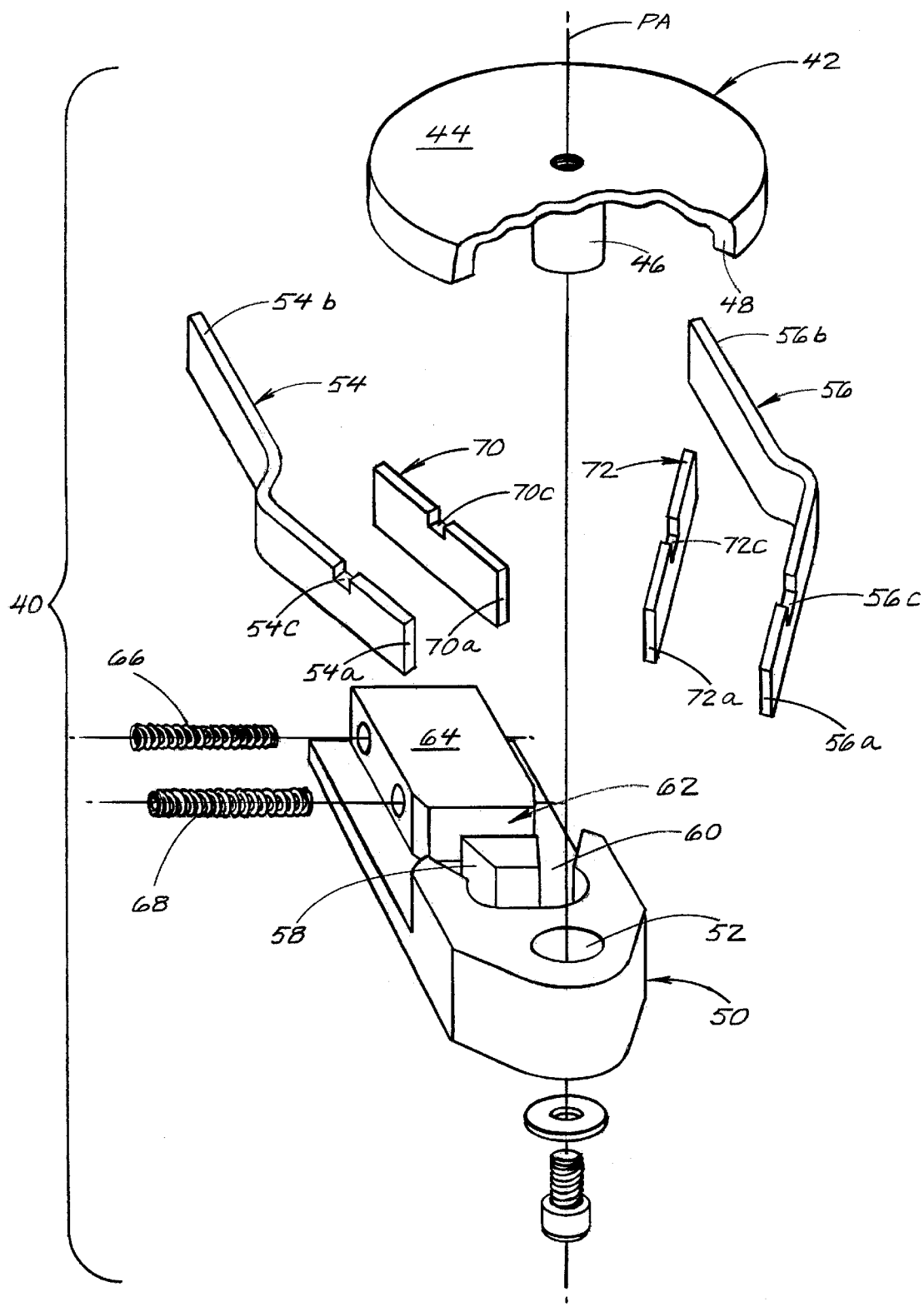
FIG. 3 is an exploded perspective view of a second embodiment of angularly adjustable coupling according to the present invention.
Figure 4:
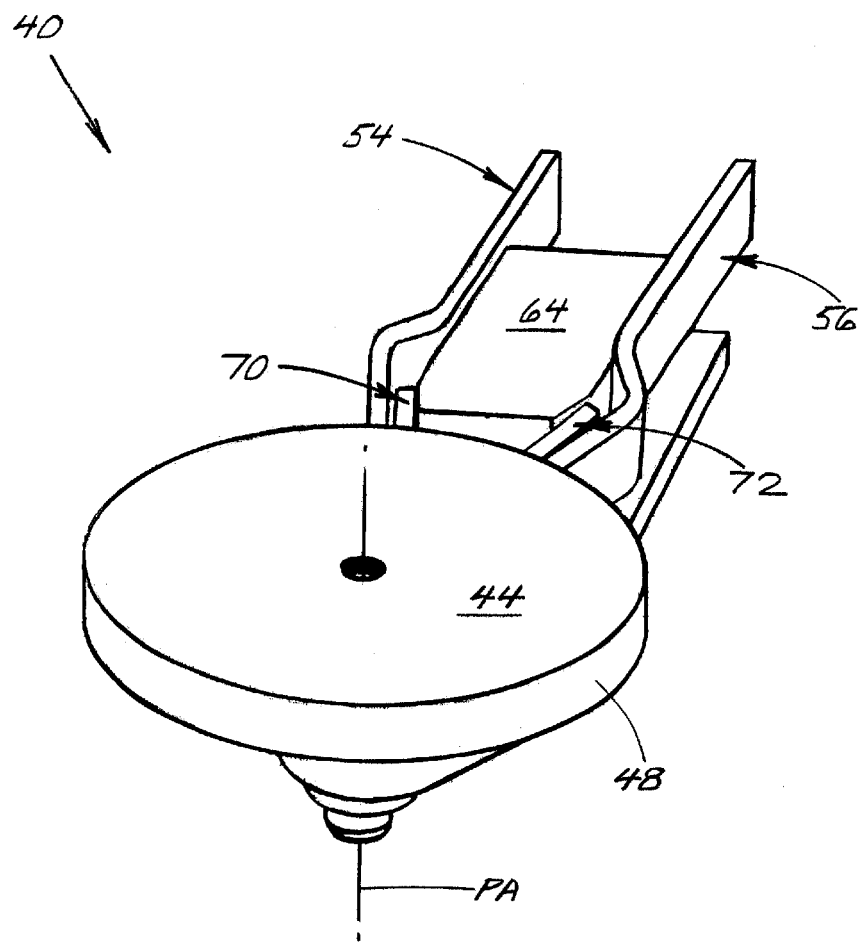
FIG. 4 is an assembled perspective view of the coupling of FIG. 3.

Referring now to FIGS. 3 and 4, a second embodiment of an angularly adjustable coupling according to the present invention is generally shown at 40. This embodiment differs from the previous embodiment mainly in that it includes four pivotal arms rather than two pivotal arms to increase the locking force exerted between the two coupling members. This embodiment also differs somewhat in the configuration of the two coupling members. However, as will be clear to those of skill in the art, the coupling members in any embodiment may be reconfigured in various ways without departing from the teachings of the present invention.

The angularly adjustable coupling 40 includes a first coupling member 42 which takes the form of a circular disk 44 with a boss 46 extending perpendicularly downwardly from the center thereof. The first coupling member 42 also has a locking rib 48 extending perpendicularly downwardly from the perimeter of the disk 44. The disk 44, boss 46, and rib 48 are all coaxial about the central pivot axis PA. The second coupling member 50 has a circular bore 52 designed to accept the boss 46 when the coupling 40 is assembled. Therefore, the bore 52 is also coaxial about the pivot axis PA. When the coupling 40 is assembled, the locking rib 48 fits into a recess 62 in the upper side of the second coupling member 50. A pair of pivotal arms 54 and 56, similar to the pivotal arms 26 and 27 in the previous embodiment, have inner ends 54a and 56a that are supported in slots 58 and 60 that extend radially outward from the bore 52. The inner ends 54a and 56a are disposed in an area inward from the area taken by the locking rib 48 when the coupling 40 is assembled. From there the pivotal arms 54 and 56 extend outwardly to outward ends 54b and 56b. Like in the previous embodiment, the pivotal arms 54 and 56 also have notches 54c and 56c designed to engage the locking rib 48. The second coupling member 50 also has a spring holder 64 which supports a pair of springs 66 and 68 designed to bias the pivotal arms 54 and 56 away from one another, thereby locking the notches 54c and 56c against the locking rib 48. Unlike the previous embodiment, the coupling 40 further includes a pair of secondary pivotal arms 70 and 72. The secondary arms are disposed adjacent the inner sides of the pivotal arms 54 and 56 and have inner ends 70a and 72a that also fit into the slots 58 and 60. However, the secondary arms 70 and 72 are shorter than the pivotal arms 54 and 56 and do not have outer ends designed to be gripped to release them. The secondary arms 70 and 72 do have notches 70c and 72c that are positioned so as to accept and lock the locking rib 48. In operation, the secondary arms 70 and 72 move generally with the pivotal arms 54 and 56 into the locked and unlocked positions. That is, as the pivotal arms 54 and 56 are biased outward into a locking position, the inner ends 54a and 56a exert pressure on the inner ends 70a and 72a of the secondary arm 70 and 72 causing them to also rotate to a splayed position wherein the notches 70c and 72c engage the locking rib 48. Also, when the pivotal arms 54 and 56 are moved inwardly to an unlocked position, the secondary arms 70 and 72 are also pushed to an unlocked position. As will be clear to those of skill in the art, this embodiment of the coupling 40 provides twice as many engagements between the pivotal arms 54, 56, 70, 72 and the first coupling member 42 so as to increase the resistance to rotational movement. However, this embodiment of the coupling 40 remains very easy to operate.

Figure 5:
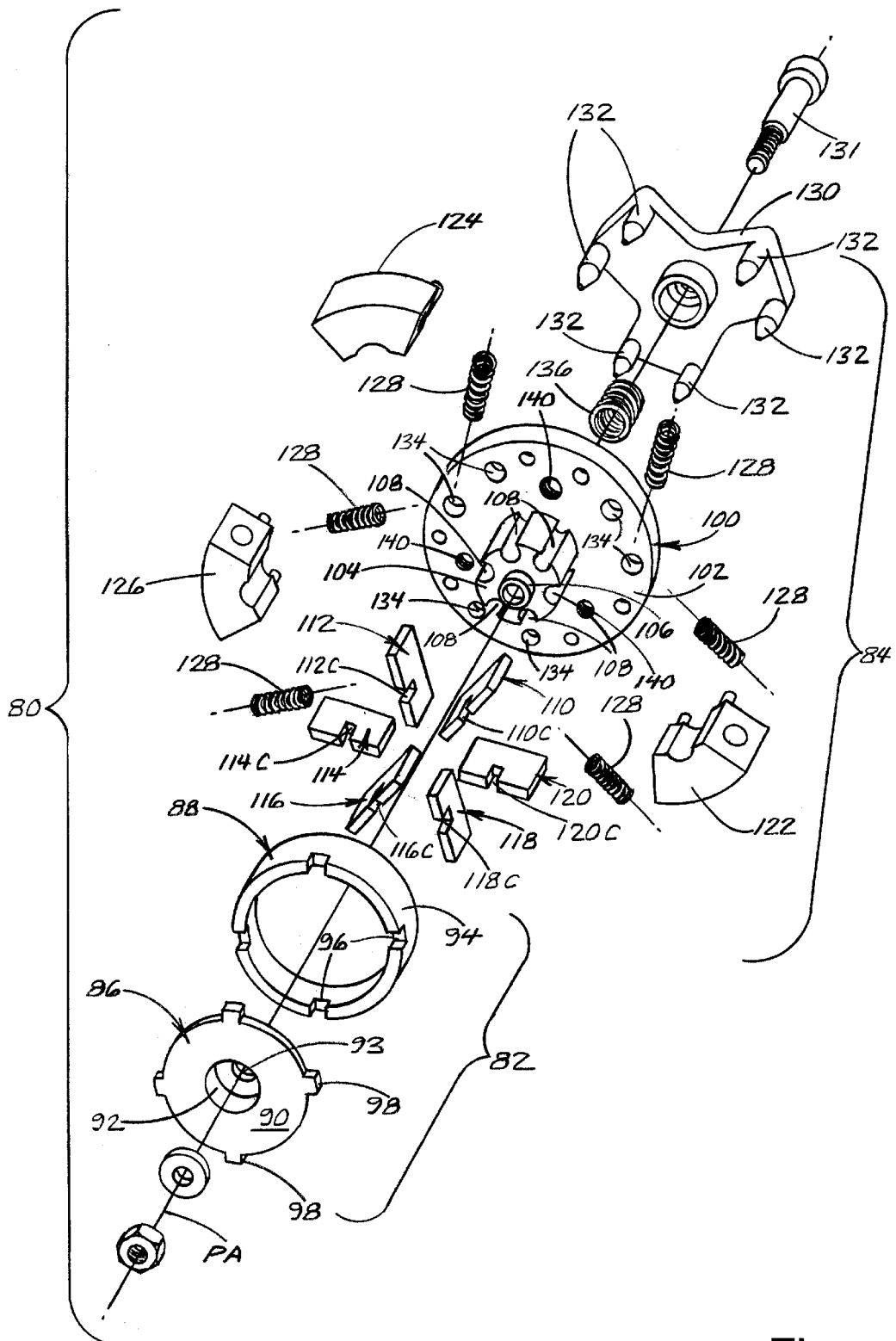
FIG. 5 is an exploded perspective view of a third embodiment of angularly adjustable coupling according to the present invention.
Figure 6:
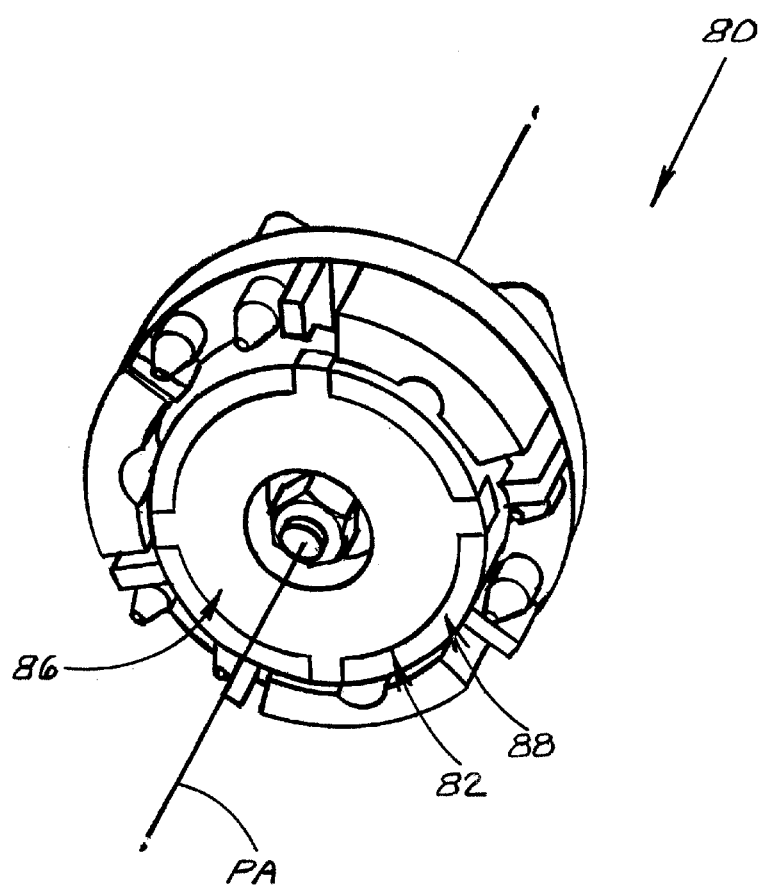
FIG. 6 is an assembled perspective view of the coupling of FIG. 5.

Referring now to FIGS. 5 and 6, a third embodiment of an angularly adjustable coupling according to the present invention is generally shown at 80. This embodiment differs from the previous embodiments in several respects. First, this embodiment uses six pivotal arms arranged radially around the coupling so as to give a uniform and substantial interlock. Also, the pivotal arms are moved from their locked to their unlocked position by a push pad with pins that force the pivotal arms into a neutral or unlocked position. This embodiment of the coupling 80 includes a first coupling member 82 and a second coupling member 84 which nest together and may be selectively locked to prevent relative angular rotation, and released to allow relative angular rotation. The first coupling member 82 is similar to the first coupling member 42 in the previous embodiment but differs in that its a two piece design. Obviously, either embodiment may be made to use either a one piece or two piece first coupling member. The first coupling member 82 has a hub portion 86 and a lock ring portion 88 which are assembled so as to form a first coupling member 82 similar to the first coupling member 42 in the previous embodiment. The hub portion 86 defines the disk 90 and boss 92, with the lock ring portion 88 defining the locking rib 94. The lock ring portion 88 has several notches 96 cut into its lower side and the hub portion 86 has a plurality of teeth 98 arranged around its perimeter which engage the notches 96 so as to interlock the hub portion 86 and lock ring portion 88. The two piece first coupling member 82 provides the advantage that the two pieces may be made of different hardness materials. For example, a particular application may require that the locking rib 94 be a very hard material to prevent galling while the remainder of the first coupling member 82 does not need to be constructed of such a hard material. This design may also be easier to manufacture. In use, one item to be coupled would be interconnected with a first coupling member 82. This may be accomplished by providing mounting holes in the disk 90 or by forming flanges or brackets for connecting objects to the first coupling member 82. When assembled, the first coupling member 82 is coaxial about the pivot axis PA, as shown.

The second coupling member 84 is also a multipiece design and includes a main body 100 with a flat circular disk 102 and a hub 104 extending perpendicularly from the center of the circular disk 102. The hub 104 and the disk 102 are both coaxial with the pivot axis PA when the coupling 80 is assembled. The hub 104 has a boss 106 extending from the end thereof that is designed to nest into a bore 93 in the center of the boss 92 of the first coupling member 82 so as to support the first and second coupling members 82 and 84 for relative angular rotation. The hub 104 also has six slots 108 extending radially inward from its outer surface. The slots 108 are evenly spaced about the pivotal PA. Six pivotal arms 110, 112, 114, 116, 118 and 120 are arranged with their inner ends disposed in the slots 108 and extend outwardly therefrom. As with the previous embodiments, each of the pivotal arms has a notch 110c–120c designed and positioned so as to accept the top edge of the locking rib 94 when the coupling 80 is assembled. As with the previous embodiments, the notches 110c–120c are shaped and positioned such that when each of the pivotal arms 110–120 is generally perpendicular to the respective portion of the locking rib 94, the locking rib 94 and the first coupling member 82 are free to rotate relative to the pivotal arms 110–120 and the second coupling member 84. The second coupling member 84 also includes three spring holders 122, 124, and 126, each of the spring holders being mounted to the disk 102 between a pair of pivotal arms 110–120. As shown, the spring supports may be separate pieces which are mounted to disk 102 when the coupling 80 is assembled. Consequently they may be made out of an inexpensive material such as plastic. Alternatively, the supports 122–126 may be an integral part of the remainder of the second coupling member 84. Springs 128 are supported by the spring holders 122–126 and bias pivotal arms 110–120 to splayed positions to lock the locking rib 94 relative to the pivotal arms 110–120. That is, the springs 128 bias the arms 110–120 to positions where they are not perpendicular to their respective portions of the locking rib 92 and therefore the edges of the notches 110c–120c engage the locking rib 94, preventing it from moving. Therefore, once assembled, the coupling 80 is naturally locked. To unlock the coupling 80, a push-pad 130 is provided. The push-pad is a generally flat body with six pins 132 extending therefrom. The push-pad 130 is supported generally parallel to the circular disk portion 102 of the main body 100 on the side away from the first coupling member 82 by pivot bolt 131. Holes 134 are provided in the disk portion 102 of the main body 100 for the pins 132 to fit in and pass through. The push-pad 130 is biased away from the back side of the disk portion 102 of the main body 100 by a spring 136. In this biased away position, the pins 132 of the push-pad 130 reside only partially within the holes 134 of the disk portion 102 of the main body 100. However, when the push-pad 130 is depressed towards the remainder of the coupling 80, the pins 132 pass more fully through the holes 134 and force the pivotal arms 110–120 back to positions wherein they are generally perpendicular to the respective portions of the locking rib 94. This releases the coupling so that the first coupling member 82 and second coupling member 84 may be angularly rotated relative to one another. When the push-pad 130 is released, the pins 132 retract allowing the springs 128 to rebias the pivotal arms 110–120 to their splayed, or locking, positions. As mentioned previously, one item to be coupled would be connected to the first coupling member 82. Likewise, the second item to be coupled would be connected to the second coupling member 84. For this purpose, mounting holes 140 are provided in the disk portion 102 of the main body 100. Other means of interconnecting an object with the second coupling member 84 will also be known to those of skill in the art.

Figure 7:
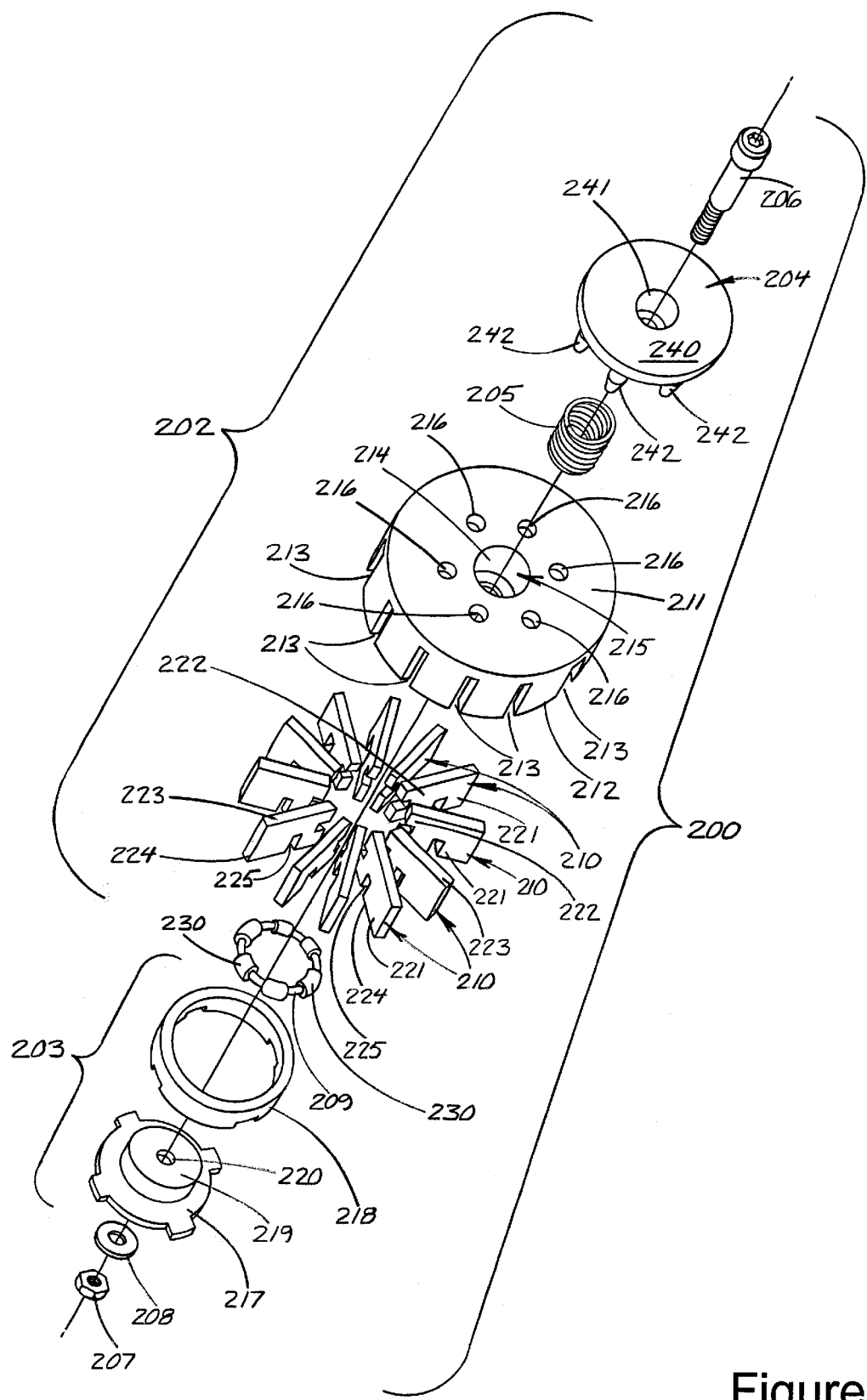
FIG. 7 is an exploded perspective view of a third preferred embodiment of an angularly adjustable coupling according to the present invention.
Figure 8:
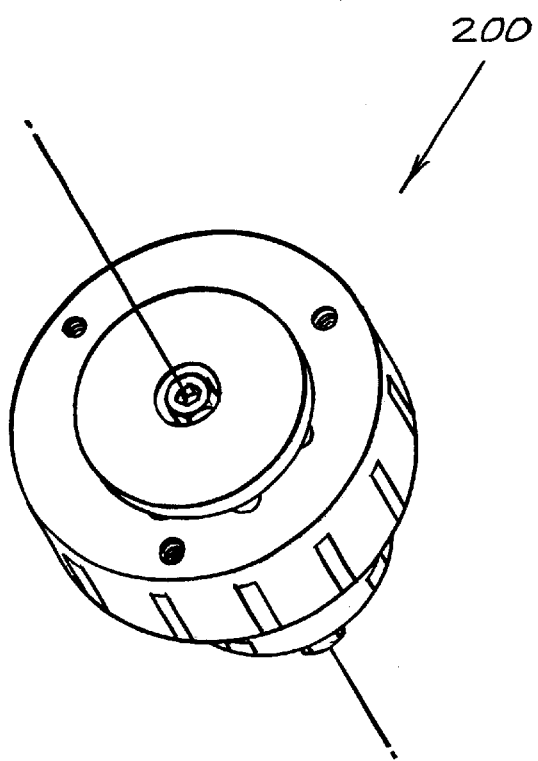
FIG. 8 is an assembled perspective view of the coupling of FIG. 7.

A third preferred embodiment of the present invention is shown in FIGS. 7 and 8. This embodiment of the coupling is generally referred to as 200. The coupling 200 is shown exploded in FIG. 7 so that the various parts of the coupling 200 may be individually described. The assembled coupling 200 is shown in FIG. 8. Like the previously described couplings, the coupling 200 is designed to selectively allow two members to be rotated relative to one another and then to be locked in a position so as to prevent relative rotational motion. The two coupling members which are allowed or prevented from relative rotational motion are labeled as 202 and 203 in FIG. 7. For clarity, the first coupling member 202 will be referred to as a pivot cup and the second coupling member 203 will be referred to as a lock cup 203. As will be clear to one of skill in the art, other items may be attached to the pivot cup 202 and lock cup 203 so that they may rotate or be locked relative to one another by the coupling 200.

The pivot cup 202 has a generally flat bottom wall 211 with a circular perimeter outer wall 212 extending perpendicularly away from the bottom wall 211. Radial slots 213 are cut into the outer wall 212 at intervals around the perimeter of the pivot cup 202. Pivot cup 202 also has a central raised portion 214 which extends away from the bottom wall 211 in the same direction as the outer wall 212.

This raised central portion 214 defines a recess in the underside of the cup 202 and a mound on the upper side of the cup 202. A post 215 extends upwardly from the top of the raised portion 214 to a height approximately equal to the height of the outer wall 212. The post 215 has a central hole defined therethrough. Several holes 216 are defined through the bottom wall 211 of cup 202 at intervals around the raised portion 214.

The lock cup 203 is similar to the pivot cup 202 in that it has a bottom wall 217 with a circular outer perimeter wall 218 extending upwardly therefrom and a central raised portion 219 also extending from the bottom wall 217. However, the lock cup 203 has a smaller diameter than the pivot cup 202. The raised central portion 219 of the lock cup 203 has a hole 220 defined therethrough which is configured so that the post 215 of the pivot cup 202 may pass therethrough. When the coupling 200 is assembled, the lock cup 203 is positioned such that the post 215 of the pivot cup 202 passes through the hole 220. The bottom walls 211 and 217 of the pivot cup 202 and lock cup 203 face away from one another and the outer wall 218 of the lock cup 203 is nested inside of the pivot cup 202.

The coupling 200 also includes a plurality of lock fingers or pivotal arms 210 which are positioned between the pivot cup 202 and lock cup 203 when the coupling 200 is assembled. In the illustrated embodiment, the coupling 200 includes twelve (12) pivotal arms 210. Each pivotal arm 210 is generally rectangular and has an outer end 221 and an inner end 222. The outer end 221 of each pivotal arm is positioned in one of the radial slots 213 in the outer wall 212 of the pivot cup 202. The inner end 222 of each pivotal arm is positioned adjacent the raised central portion 214 of the pivot cup 202. Therefore, the pivotal arms 210 extend radially outwardly from the central portion 214 of the pivot cup 202 at radial intervals about the central portion 214. Extending between the first end 221 and second end 222 of each pivotal arm 210 are a pair of edges which we will define as a first edge 223 and a second edge 224. The first edge 223 of each of the pivotal arms 210 rests against the inside of the bottom wall 211 of the pivot cup 202 when the coupling 200 is assembled. The second edge 224 has a notch 225 defined therein. Each notch 225 in each second edge 224 of each pivotal arm 210 fits over the upper end of the outer wall 218 of the lock cup 203 when the coupling 200 is assembled. The pivotal arms 210 serve to lock the lock cup 203 relative to the pivot cup 202. The pivotal arms 210 cannot rotate relative to the pivot cup 202 because the outer ends 221 of each of the pivotal arms 210 rests in one of the radial slots 213 in the outer wall 212 of the pivot cup 202. The lock cup 203 may be allowed to rotate relative to the pivot cup 202 depending upon the position of the pivotal arms 210. When the coupling 200 is locked, the notches 225 in the pivotal arms 210 engage the outer wall 218 of the lock cup 203 preventing it from rotating relative to the pivot cup 202. When the coupling 200 is unlocked, the notches 225 and the pivotal arms 210 release the outer wall 218 of the lock cup 203 and allow it to rotate relative to the pivot cup 202.

The locking and unlocking of the coupling 200 will now be described. An additional element of the coupling 200 is a spring ring 209. The spring ring 209 may be of various configurations and designs as will be clear to one of skill in the art. In FIG. 7, the spring ring 209 is shown as the ring with a plurality of elastomer portions 230 arranged thereon. The elastomer portions 230 of the illustrated spring ring 209 are made of a resilient material such as rubber. As illustrated, the spring ring 209 has half as many elastomer portions 230 as there are pivotal arms 210; that is, six (6). When the coupling 200 is assembled, the elastomer portions 230 of the spring ring 209 are positioned between adjacent pivotal arms 210 such that one elastomer portion 230 is positioned between every other pivotal arm 210. The inner ends 222 of the arms 210 have slots to accommodate the ring 209.

The pivotal arms 210 operate in pairs. Therefore, if you look at the pivotal arms 210 as six (6) sets of pairs, an elastomer portion 230 is positioned between each of the pairs. Because the elastomer portions 230 are resilient material, they exert a sideways force between the pair of pivotal arms 210. This causes the pivotal arms to move slightly apart, thereby causing the notch 225 in each of the pivotal arms 210 to grip the outer wall 218 of the lock cup 203. In FIG. 7, the pivotal arms 210 are shown in a neutral position wherein they extend directly radially outwardly from the raised central portion 214 of the pivot cup 202. In this position, the outer wall 218 of the lock cup 203 can pass through the notches 225 in the second edge 224 of each of the pivotal arms 210. When the coupling 200 is assembled, with the elastomer portions 230 positioned between each pair of pivotal arms 210, the pivotal arms 210 are spread apart such that each of the notches 225 tilt slightly thereby gripping the outer wall 218 of the lock cup 203. As illustrated, the coupling 200 has twelve pivotal arms 210 and therefore has six elastomer portions 230 on the spring ring 209. However, as will be clear to one of skill in the art, the coupling 200 may be constructed with more or fewer pivotal arms 210 and corresponding elastomer portions 230.

As should be clear from the previous discussion, when the coupling 200 is assembled, the elastomer portions 230 between each pair of pivotal arms 210 cause the pivotal arms 210 to spread apart thereby locking the lock cup 203 relative to the pivot cup 202. Therefore, once assembled, the coupling 200 is locked. Unlocking of the coupling 200 will now be described. An additional element of the coupling 200 is a release pad 204. The release pad 204 is a generally circular disc 240 with a central hole 241 defined therethrough and six tapered posts 242 extending perpendicularly from the circular disc 240. The release pad 204 is positioned such that the tapered posts 242 pass through the holes 216 in bottom wall 211 of the pivot cup 202. The tapered posts 242 pass through the holes 216 to a position in between every other pivotal arm 210. The holes 216 and the posts 242 are positioned such that the ends of the tapered posts 242 reside between adjacent pivotal arms where an elastomer portion 230 is not residing. That is, if we look at a pair of pivotal arms 210, and if that pair of pivotal arms 210 has an elastomer portion 230 between them, a post 242 would not be positioned between that pair. Instead, a post 242 would be positioned on each side of the pair of pivotal arms, between that pair of pivotal arms 210 and the next adjacent pair of pivotal arms 210. As the release pad 204 is moved against the bottom wall 211 of the pivot cup 202, and the tapered posts 242 pass further through the holes 216, the posts 242 force the pivotal arms 210 back into a neutral position thereby unlocking the coupling 200. As the tapered posts 242 move between alternate pivotal arms 210, the posts 242 cause the elastomer portions 230 to be compressed as the spread pivotal arms 210 are forced back to their neutral position.

A spring 205 is positioned between the release pad 204 and the pivot cup 202 with the spring 205 residing in the recess defined by the raised central portion 214. The spring 205 biases the release pad 204 away from the pivot cup 202 so that the posts 242 are biased away from the pivotal arms 210. With the release pad 204 biased away from the pivot cup 202, the coupling 200 is locked because the elastomer portions 230 spread the pivotal arms 210 apart and the posts 242 are too far retracted to unlock the coupling 200. To unlock the coupling 200, the release pad 204 is pressed towards the pivot cup 202 thereby returning the pivotal arms 210 to a neutral position and unlocking the coupling 200.

The coupling 200 is held together by a bolt 206 which passes through the central hole of the release pad 204, the central hole in the pivot cup 202 and lock cup 203 and engages a nut 207 on the opposite side of the cup 200. A washer 208 is preferably positioned between the nut 207 and the rest of the coupling 200.

Figure 9:
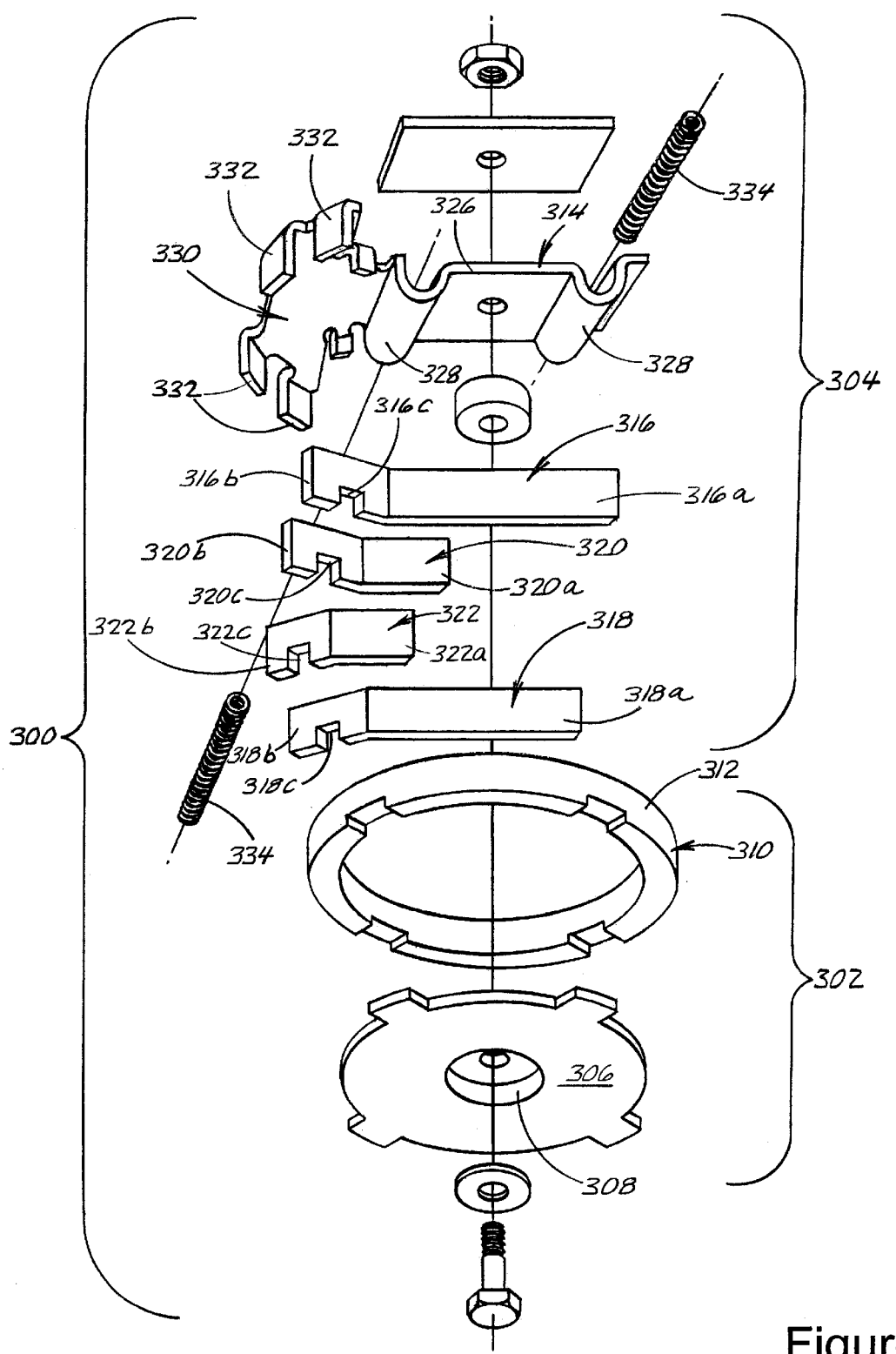
FIG. 9 is an exploded perspective view of a fifth preferred embodiment of an angularly adjustable coupling according to the present invention.
Figure 10:
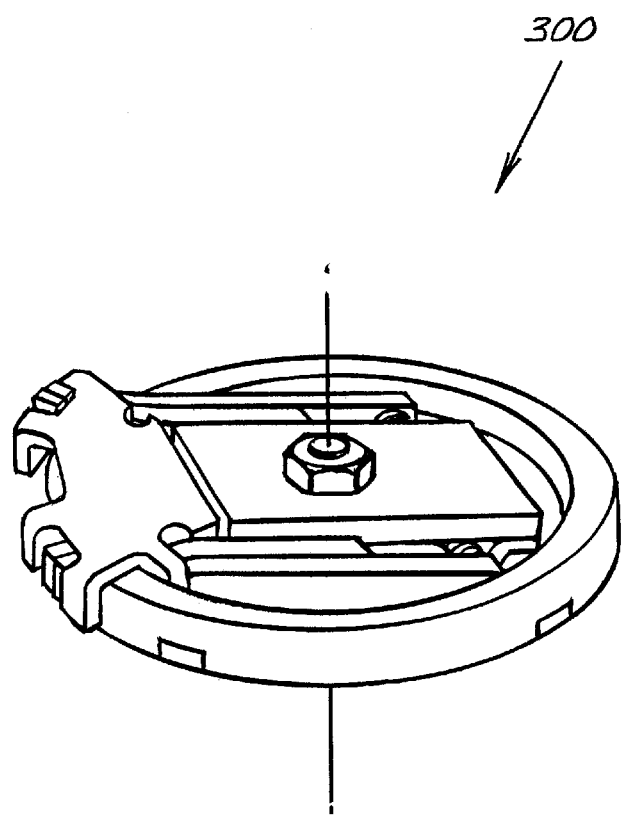
FIG. 10 is an assembled perspective view of the coupling of FIG. 9.

Referring now to FIGS. 9 and 10, a fifth embodiment of an angular adjustable coupling according to the present invention is generally shown at 300. The coupling 300 includes a first coupling member 302. The first coupling member 302 is similar to in the previous embodiments with a disk 306, a hub 308 and a locking ring 310 defining a locking rib 312. The second coupling member 304 has a main body 314 with a pair of pivotal arms 316 and 318 and a pair of secondary pivotal arms 320 and 322. This embodiment differs from the previous embodiments in that the outer ends 316b–322b contain the locking notches 316c–322c which are responsible for locking the coupling members 302 and 304 relative to one another. As shown, the main body 314 has a central portion 326 that includes a pair of spring supports 328. The central portion 326 has generally parallel sides and one of the pivotal arms 316 and 318 is disposed adjacent each of the sides of the central portion 326. The main body 314 also has an outer portion 330. The outer ends 316b–322b of the arms 316–322 extend out to positions adjacent to this outer section 330. The outer portion 330 includes downwardly extending tabs 332 for limiting movement of the arms 316–322. These tabs 332 prevent excess movement of the outer ends 316b–322b of the arms 316–322. The inner ends 316a–322a become nested within the locking ring 310 when the coupling 300 is assembled, and therefore cannot move outwardly beyond a certain distance. Springs 334 bias the arms 316 and 318 apart, thereby causing the notches 316c and 318c to engage the locking rib 312 and preventing relative movement between the coupling members 302 and 304. The arms 320 and 322 move also. To release the coupling, a user squeezes the inner ends 316a and 318a of the arms 316 and 318 to return the arms 316–322 to a neutral, or unlocked, position. The remaining details of this embodiment should be clear to those of skill in the art from FIGS. 9 and 10.

Figure 11:
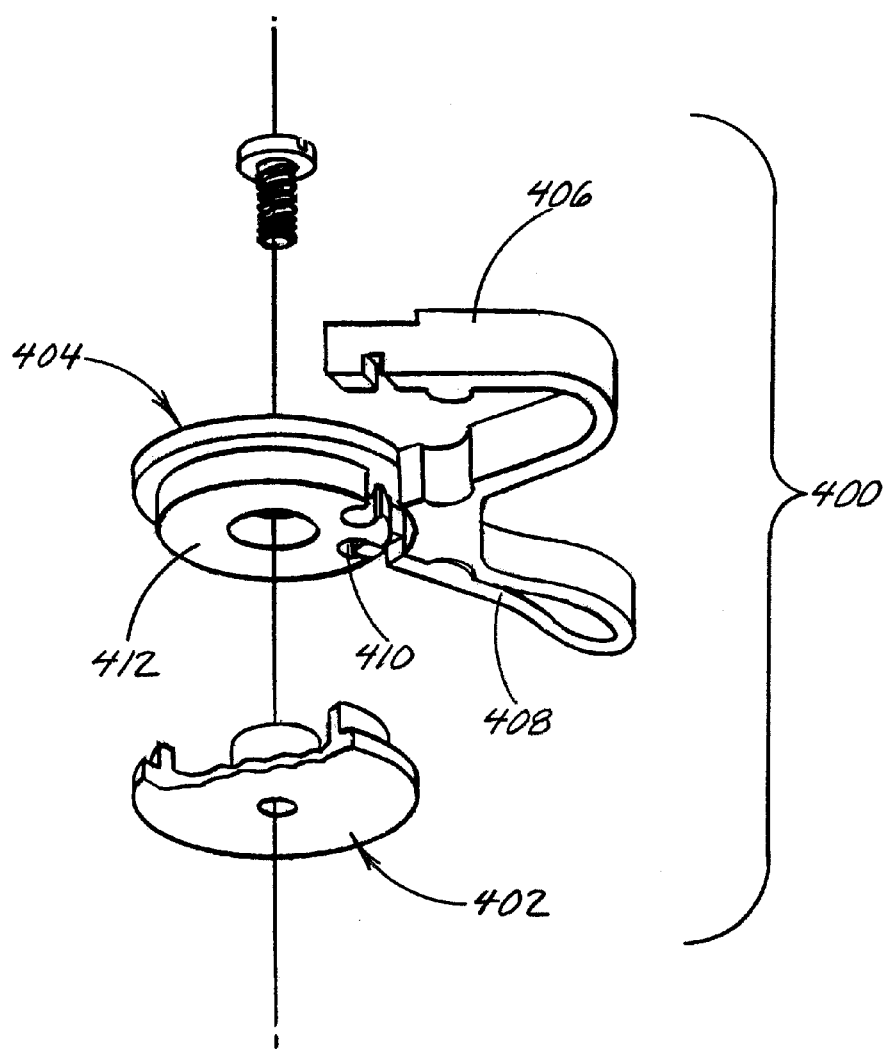
FIG. 11 is an exploded perspective view of yet another embodiment of an angularly adjustable coupling according to the present invention.
Figure 12:
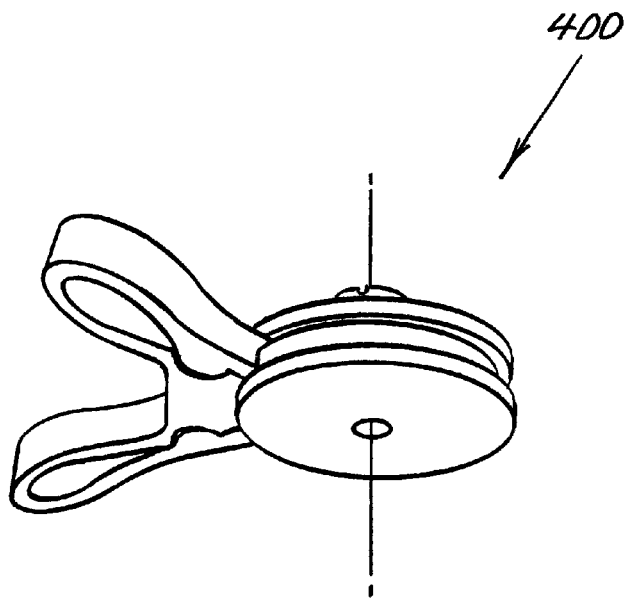
FIG. 12 is an assembled perspective view of the coupling of FIG. 11.

Referring now to FIGS. 11 and 12, yet another embodiment of an angularly adjustable coupling is generally shown at 400. This embodiment of the present invention is very similar to the first described embodiment except that the first coupling member 402 and second coupling member 404 may be molded from plastic making for a very inexpensive coupling 400. As shown, the pivotal arms 406 and 408 are molded as part of the second coupling member 404, thereby eliminating the need for springs to bias the arms 406 and 408 to a locking position. In FIG. 11, one of the arms is shown assembled with its inner end in a slot 410 in a boss 412 of the second coupling member 404. The other arm 406 is shown in its as molded position so as to illustrate the outward bias of the arms 406 and 408 once they are assembled. Additional details of this embodiment will also be clear to those of skill in the art, with reference to FIGS. 11 and 12.

Referring now to FIGS. 13–27, a variety of release mechanisms for use with couplings according to the present invention are illustrated. As will be clear to those of skill in the art, the herein described couplings may be adapted so that they may be released in a number of ways, depending on the desired application. For example, in FIG. 13, a pull cable release is sketched. As shown, a coupling may be adapted such that a cable causes pivotal locking arms to rotate into or out of a locking position. This may be beneficial in applications where remote locking and unlocking of the coupling is desirable.

FIG. 14 shows a sketch of a pinch release, as was previously described

FIGS. 15 and 16 show the use of a single push-pin that is forced between a pair of pivotal arms in order to adjust their position.

FIGS. 17 and 18 show a release that uses a push-pad with four pins, each pin adjusting the position of one pivotal arm.

FIGS. 19 and 20 show a pivotal lever that may be used to squeeze a pair of pivotal arms together.

FIG. 21 shows an external push wedge which would allow a pair of pivotal arms to be moved towards each other by pushing the wedge towards the arms.

FIG. 22 is similar to FIG. 21 except that the pivotal arms are crossed and the wedge ramps are reversed so that the wedge causes the outer ends of the pivotal arms to spread apart.

FIG. 23 uses a lever arm to squeeze a pair of pivotal arms together.

FIG. 24 uses a wedge that is pulled out away from the pivotal arms to spread the pivotal arms apart.

FIG. 25 is a sketch of a rotary cam release that allows rotational movement to cause movement of the pivotal arms.

FIGS. 26 and 27 illustrate a release wherein a push-pad with pins is moved into engagement with the pivotal arms by the action of a rotary screw. As the small lever is rotated, the push pad is moved into releasing position. As will be clear to those of skill in the art, numerous other release mechanisms are possible for use with the present invention.

The proceeding specification and drawings illustrate and discuss several preferred embodiments of the present embodiment. However, those of skill in the art will recognize that other embodiments are possible without departing from the scope or teaching of the present invention. It is the following claims, including all equivalents, that define the scope of the invention.

What is claimed is:

1. An angularly adjustable coupling, comprising:
   a first coupling member, a second coupling member, and a pivotal mounting interconnecting said members about a pivot axis;
   said first coupling member including a locking rib of circular configuration coaxial with said pivot axis;
   said second coupling member including a pair of pivotal arms having inner ends disposed within the area inward of said locking rib, outer ends extending outwardly of the area occupied by said locking rib, and locking surfaces between said inner and outer ends engageable with said locking rib for locking the two coupling members against pivotal movement;
   said pair of pivotal arms being biased to a normal position away from each other to cause their locking surfaces to engage said locking rib, and thereby to lock the two coupling members against pivotal movement;
   said pivotal arms being moveable by a user toward each other to cause the locking surfaces to release from the locking rib, and thereby to permit one coupling member to be pivoted with respect to the other coupling member and to be locked in the pivoted position by releasing said pivotal arms.

2. The coupling according to claim 1, wherein said locking surfaces of the pivotal arms are defined by opposed edges of a passageway formed in each pivotal arm for receiving the circular locking rib; the distance between said opposed edges of each passageway being slightly larger than the width of the locking rib such that when the pivotal arms are moved towards each other, said edges release the locking rib to permit pivoting of one member with respect to the other, and when the pivotal arms are permitted to return to their normal biased position, said opposed edges engage the locking rib to lock the second member thereto by a wedging action.

3. The coupling according to claim 2, wherein said circular locking rib is a circular ridge integrally formed in said first coupling member.

4. The coupling according to claim 3, wherein said passageway in each pivotal arm is a slot formed in one edge of the pivotal arm of larger width than that of the wall.

5. The coupling according to claim 1, wherein said pivotal arms are biased by springs engageable with mid-portions of said pivotal arms, urging said pivotal arms to normal positions away from each other.

6. The coupling according to claim 1, wherein said pivotal mounting includes:
said first coupling member including a first boss coaxial with said pivot axis;
said second coupling member including a second boss coaxial with said pivot axis;
one of said bosses having a cylindrical bore and snugly enclosing the other of said bosses.

7. The coupling according to claim 6, wherein said second boss includes said cylindrical bore and is formed with a pair of radial slots for receiving said inner ends of the pivotal arms.

8. The coupling according to claim 6, wherein said first boss is formed with a bore coaxial with said pivot axis and includes a pin received within said bore and pivotally mounting said two coupling members together at said pivot axis.

9. An angularly adjustable coupling, comprising:
a first coupling member, a second coupling member, and a pivotal mounting interconnecting said members together about a pivot axis;
said first coupling member including a locking rib of circular configuration coaxial with said pivot axis;
said second coupling member including a pair of pivotal arms having inner ends disposed within the area inward of said locking rib, outer ends extending outwardly of the area occupied by said locking rib, and locking surfaces between said inner and outer ends engageable with said locking rib for locking the two coupling members against pivotal movement;
said pivotal arms being moveable to one position with respect to each other to cause said locking surfaces to engage said locking rib and thereby to lock the two coupling members against pivotal movement, or to a second position to cause said locking surfaces to release from said locking rib and thereby to permit the two coupling members to be pivoted to a new angular position with respect to each other.

10. The coupling according to claim 9, wherein said circular locking rib is a circular wall integrally formed in said first coupling member.

11. The coupling according to claim 10, wherein said passageway in each pivotal arm is a slot formed in one edge of the pivotal arm of larger width than that of the ridge.

12. The coupling according to claim 9, wherein:
said pair of pivotal arms are spring-biased to a normal position away from each other to cause their locking surfaces to engage said locking rib, and thereby to lock the two coupling members against pivotal movement;
the outer ends of the pivotal arms being moveable by a user toward each other to disengage the locking surfaces from the locking rib, and thereby to permit one coupling member to be pivoted with respect to the other coupling member and to be locked in the pivoted position by releasing said outer ends of the pivotal arms.

13. An angularly adjustable coupling, comprising:
a first coupling member, a second coupling member, and a pivotal mounting interconnecting said members together about a pivot axis;
said first coupling member including a locking rib of circular configuration coaxial with said pivot axis;
said second coupling member including a pair of pivotal arms having inner ends disposed within the area inward of said locking rib, outer ends extending outwardly of the area occupied by said locking rib, and locking surfaces between said inner and outer ends engageable with said locking rib for locking the two coupling members against pivotal movement;
said outer ends of the pivotal arms being moveable to one position with respect to each other to cause said locking surfaces to engage said locking rib and thereby to lock the two coupling members against pivotal movement, or to a second position to cause said locking surfaces to release from said locking rib and thereby to permit the two coupling members to be pivoted to a new angular position with respect to each other;
said pivotal mounting including a first boss integrally formed with said first coupling member coaxial with said pivot axis, and a second boss integrally formed with said second coupling member coaxial with said pivot axis;
one of said bosses having a cylindrical bore for enclosing the other of said bosses.

14. The coupling according to claim 13, wherein said locking surfaces of the pivotal arms are defined by opposed edges of a passageway formed in each pivotal arm for receiving the circular locking rib; the distance between said opposed edges of each passageway being slightly larger than the width of the locking rib such that when the pivotal arms are moved towards each other, said edges disengage from the locking rib to permit pivoting of one member with respect to the other, and when the pivotal arms are released to their normal biased position, said opposed edges engage the locking rib to lock the second member thereto by a wedging action.

15. The coupling according to claim 14, wherein said circular locking rib is a circular wall integrally formed in said first coupling member, and said passageway in each pivotal arm is a slot formed in one edge of the respective pivotal arm of larger width than that of the wall.

* * * * *

UNITED STATES PATENT AND TRADEMARK OFFICE
CERTIFICATE OF CORRECTION

PATENT NO. : 6,244,779 B1
DATED : June 12, 2001
INVENTOR(S) : Michael Slasinski

It is certified that error appears in the above-identified patent and that said Letters Patent is hereby corrected as shown below:

<u>Column 5,</u>
Line 34, after "opposite" delete -- 10 --.

Signed and Sealed this

Ninth Day of April, 2002

Attest:

Attesting Officer

JAMES E. ROGAN
*Director of the United States Patent and Trademark Office*